(12) United States Patent
Schoonover et al.

(10) Patent No.: US 12,115,711 B2
(45) Date of Patent: *Oct. 15, 2024

(54) EXTRUDED FASTENER AND METHOD FOR MAKING SAME

(71) Applicant: Vintech Industries, Inc., Imlay City, MI (US)

(72) Inventors: James Schoonover, Shelby Township, MI (US); Robert Rutoski, Imlay City, MI (US); Kevin J. Weingartz, Imlay City, MI (US)

(73) Assignee: Vintech Industries Inc., Imlay City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/345,910

(22) Filed: Jun. 30, 2023

(65) Prior Publication Data

US 2023/0339163 A1   Oct. 26, 2023

Related U.S. Application Data

(63) Continuation of application No. 17/532,449, filed on Nov. 22, 2021, now Pat. No. 11,724,429, which is a continuation of application No. 16/048,994, filed on Jul. 30, 2018, now Pat. No. 11,207,812.

(60) Provisional application No. 62/538,355, filed on Jul. 28, 2017.

(51) Int. Cl.
*B29C 48/00* (2019.01)
*B29C 48/12* (2019.01)
*B29L 31/00* (2006.01)
*F16B 21/08* (2006.01)

(52) U.S. Cl.
CPC .......... *B29C 48/0022* (2019.02); *B29C 48/12* (2019.02); *F16B 21/084* (2013.01); *F16B 21/086* (2013.01); *B29C 2791/001* (2013.01); *B29C 2793/0054* (2013.01); *B29C 2793/009* (2013.01); *B29L 2031/7282* (2013.01)

(58) Field of Classification Search
CPC ................. B29C 2731/0054; B29L 2031/7282
See application file for complete search history.

(56) References Cited

U.S. PATENT DOCUMENTS

| | | | |
|---|---|---|---|
| 11,724,429 B2 * | 8/2023 | Schoonover .......... | F16B 21/086 264/148 |
| 2003/0165660 A1 * | 9/2003 | Schwarzwalder .... | B29C 43/021 264/297.8 |

(Continued)

*Primary Examiner* — Nahida Sultana
*Assistant Examiner* — Virak Nguon
(74) *Attorney, Agent, or Firm* — Warn Partners, P.C.

(57) ABSTRACT

An extruded integrated fastener assembly comprising a plurality of fasteners cut to length from an extruded length of material. Unwanted areas of material are cut away leaving the individual fasteners, which fasteners are also connected together by an expanse of material that remains. The fastener assembly can be single durometer or double durometer. A profile with retention members and/or leg features are formed in the fasteners for connecting to a predetermined component. The process for manufacturing the extruded integrated fastener assembly includes providing fabrication tooling suitable to cut away the unwanted area between the fasteners. The fasteners are thereby able to be cut to any desired length.

12 Claims, 7 Drawing Sheets

(56) References Cited

U.S. PATENT DOCUMENTS

| | | | | |
|---|---|---|---|---|
| 2007/0134073 A1* | 6/2007 | Shereyk | ................ | F16B 21/084 411/510 |
| 2012/0110793 A1* | 5/2012 | Watanabe | ........... | B60R 13/0206 24/289 |
| 2014/0298638 A1* | 10/2014 | Colombo | .............. | F16B 21/086 403/280 |

* cited by examiner

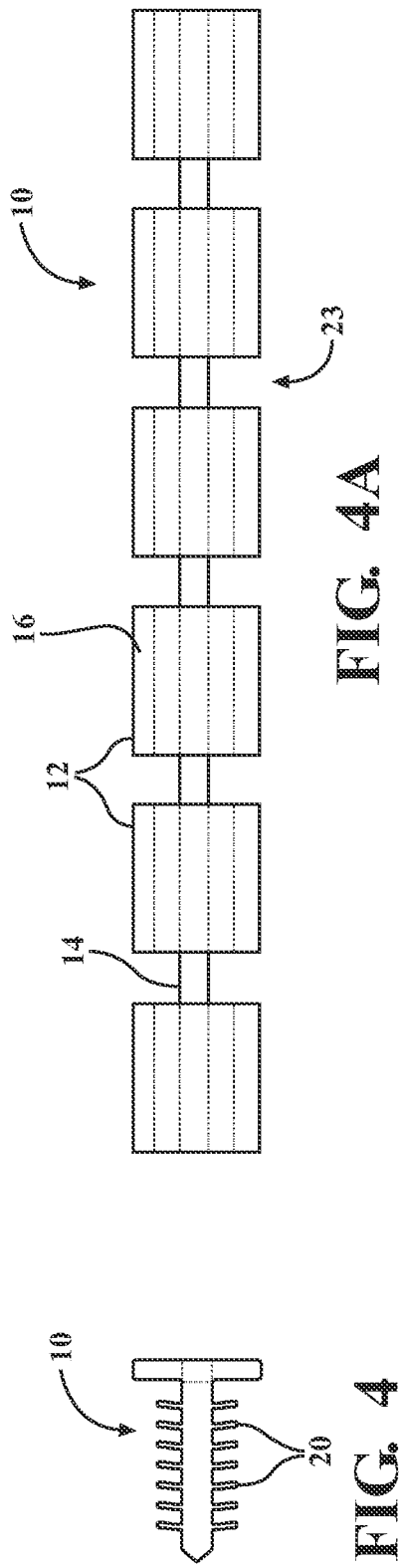
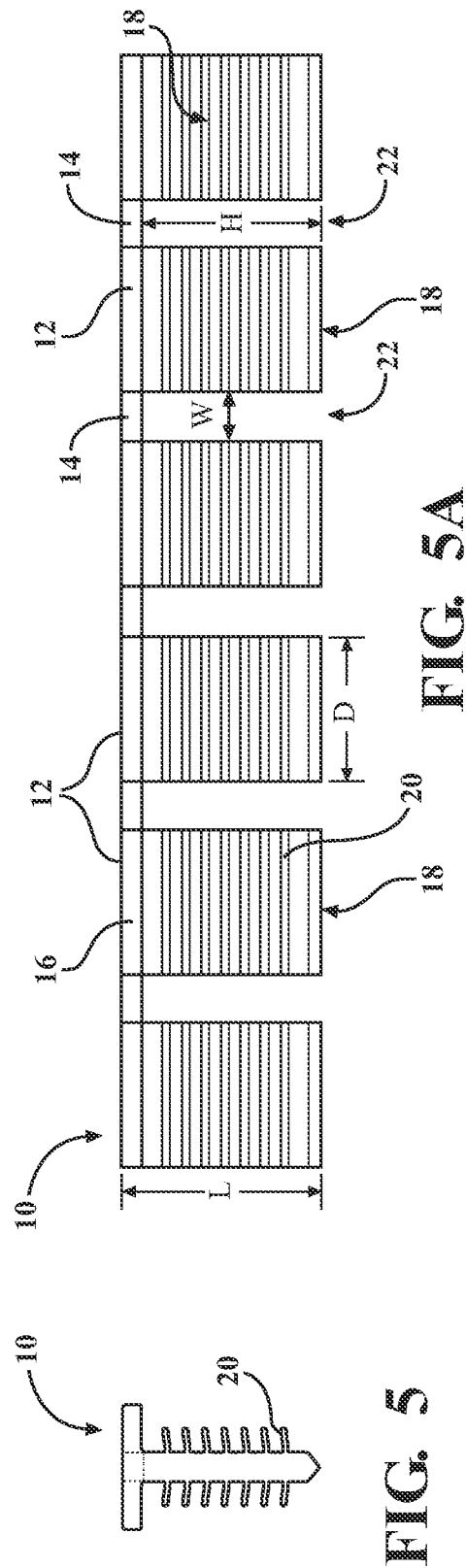

EXTRUDED FASTENER AND METHOD FOR MAKING SAME

CROSS-REFERENCE TO RELATED APPLICATIONS

This application is a continuation of U.S. patent application Ser. No. 17/532,449, filed Nov. 22, 2021, which is a continuation of U.S. patent application Ser. No. 16/048,994, filed Jul. 30, 2018, now U.S. Pat. No. 11,207,812, which claims the benefit of U.S. Provisional Application No. 62/538,355 filed Jul. 28, 2017. The disclosures of the above applications are incorporated herein by reference.

FIELD OF THE INVENTION

The present invention relates to an integrated fastener and process for manufacturing same.

BACKGROUND OF THE INVENTION

Current extruded fasteners, such as extruded push pins and attachment clips or attachment clip strips, are rather expensive to manufacture. The process for manufacturing can also be time consuming. One common method is molding push pins. In addition, the fasteners do not have adequate retention. There is also less capability for effectively and efficiently changing the fastener length, when desired. Typical fasteners are also individual pieces that may become lost easier or be undesirable for certain applications.

Therefore, it is desirable to have an integrated fastener and method for making same which incorporates fabrication tooling for the integrated fastener to be cut to any desired length.

SUMMARY OF THE INVENTION

The present invention is generally directed to an extruded integrated fastener with at least two fasteners, preferably, push pin fasteners. A continuous strip of predetermined profile is extruded. By way of non-limiting example, the extrusion includes a wider upper portion which is integrally formed with a lower depending portion having a plurality of grippers extending longitudinally along the lower depending portion of the continuous extrusion. Fabrication tooling is provided to form the integrated fastener. Preferably, to fabricate notches of predetermined width along the longitudinal length of the lower depending portion or "extending portion" to form a series of fasteners (most preferably, push pins) that are connected only to the wider upper portion, e.g., to gang parts together. The fabrication tooling cuts away the unwanted area on either side of each fastener. The fasteners can thereby be cut to any predetermined desired length depending on the application.

The process in accordance with the present invention provides improved costs in manufacturing, e.g., about ¼ the cost of conventional fabrication. The product also has improved retention. And the fasteners are ganged or linked together by a strip of the extruded material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a front elevation view of the extruded integrated fastener assembly, in accordance with the present invention;

FIG. 4a is a top plan view of the extruded integrated fastener assembly of FIG. 4 depicting a plurality of fasteners ganged together, in accordance with the present invention;

FIG. 5 is a front elevation view of the extruded integrated fastener assembly in a 90 degree orientation from FIG. 4;

FIG. 5a is a side elevation view of the extruded integrated fastener assembly of FIGS. 4-5 depicting the plurality of fasteners ganged together, in accordance with the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
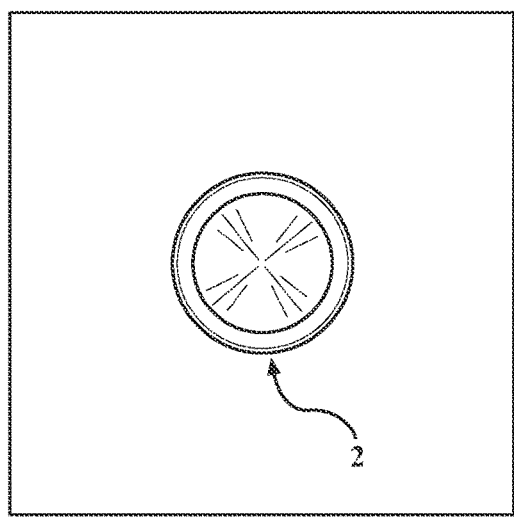
FIG. 1 is a perspective view of a convention individual push pin.
Figure 2:
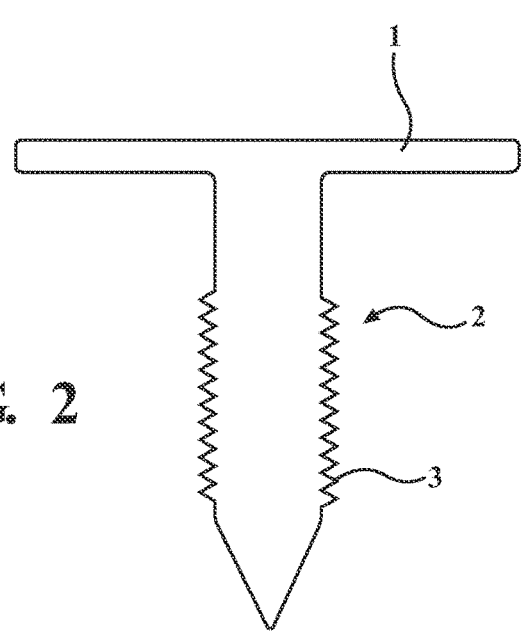
FIG. 2 is a front elevation of the push pin of FIG. 1.
Figure 3:
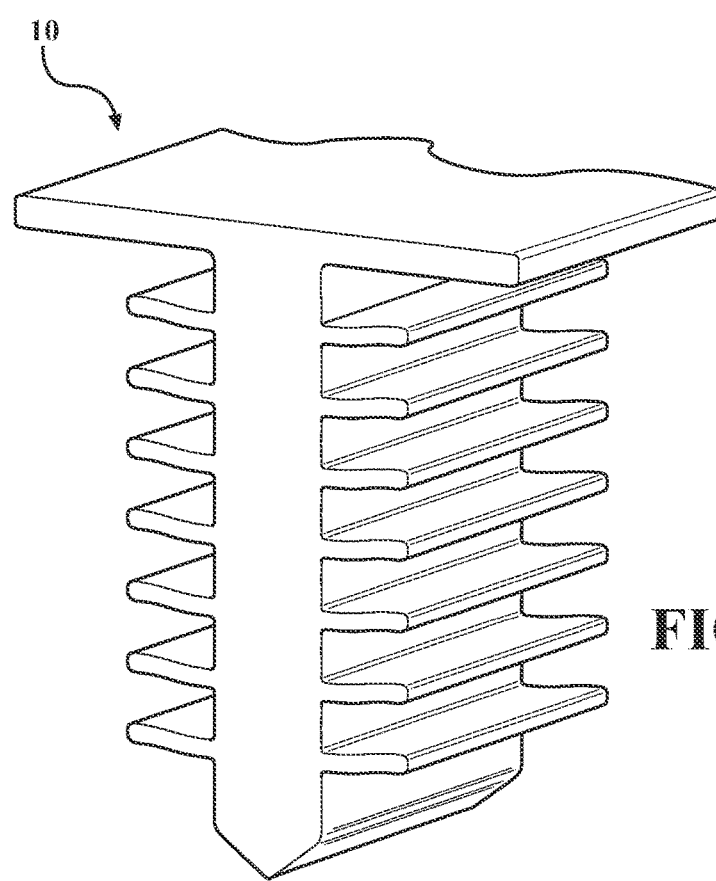
FIG. 3 is a perspective view of an extruded integrated fastener assembly broken along its length to depict that the strip may be any desired predetermined length depending on the particular application, in accordance with the present invention.

FIGS. 1-2 depict an example of a conventional individual push pin. The larger head 1 is square, but other conventional push pins have round, C-shaped, etc heads. The body is a narrower shaft 2 with teeth 3 or other shaft retaining feature such as circumferential threads.

Referring to FIGS. 3-18 generally, in accordance with the present invention there is provided an extruded integrated fastener assembly, e.g., most preferably, push pins, linked together by an expanse of material, and a process for manufacturing same. It is understood that the fastener comprises any predetermined profile suitable for retention and predetermined properties depending on the particular application without departure from the scope of the present invention. By way of non-limiting example, each extruded integrated fastener assembly incorporates one or more fastener types which are push pins, attachment clips, Christmas tree fasteners, pop rivets, push rivets, clip fasteners, or any other suitable fastener and profile, etc and any combination of fasteners.

Referring more particularly to FIGS. 3-9 generally, in accordance with the present invention there is provided the extruded integrated fastener assembly shown generally at 10 including the at least two fasteners 12 (e.g., most preferably, push pins of predetermined width, depth, length and durometer(s) depending on the particular application) linked together by an expanse of material 14. During fabrication, the extrusion is a continuous piece and the predetermined tooling cuts away the unwanted areas of the fasteners 12, e.g., push pins, most preferably clip fasteners, forming at least an upper portion 16 and a lower portion, shown generally at 18. The extruded continuous piece has a predetermined profile depending on the particular application. The fasteners can be any desired length "L" depending on the particular application. The lower portion 18 of the extrusion additionally has at least one retention member, preferably has a plurality of retention members 20. Most preferably, the retention members 20 are grippers. These grippers 20 can be in parallel rows along the longitudinal length of the sides of the fasteners 12 (e.g., see FIGS. 6-7), or, offset from each other (e.g., see FIGS. 8-9).

After being extruded, the continuous strip is notched out or otherwise cut to define individual fasteners 12. In particular, the lower depending portion of the strip is cut out at predetermined intervals to form gaps, shown generally at 22, in the extrusion. These gaps have a predetermined width "W" that define the space between the lower portions 18 of adjacent fasteners 12, and thereby the depth "D" of each fastener lower portion 18. The predetermined width "W" of the gaps 22 between adjacent fasteners 12,12 depends on the particular application. The gaps 22 have a height "H" that defines height of the lower portions 18 from the underside of the upper portion 16. The predetermined length L and predetermined depth D of the fasteners 12 depend on the particular application. The upper portion 16 of the continuous strip 10 is also cut away at predetermined intervals to define the distance between the top 16 of each fastener 12 and the width of each expanse of material 14 that chains adjacent fasteners 12 together.

Alternatively, the top portion 16 of the continuous strip is not cut, but rather links the plurality of fasteners 18 together without a narrower expanse of material providing the assembly 10. Thus, the expanse of material 14 would be a seamless continuous portion of the upper portion 16 when viewed from a top plan view.

The assembly 10 is a single durometer or a dual durometer, depending on the application.

Figure 6:
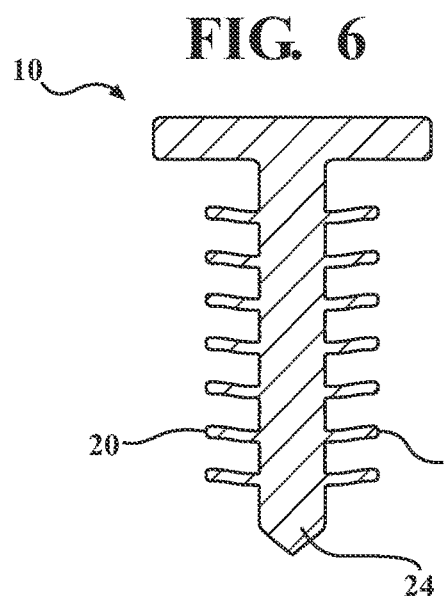
FIG. 6 is an enlarged front elevation view of the extruded integrated fastener of FIG. 4 illustrating an exemplary single durometer and substantially parallel grippers, in accordance with the present invention.

FIG. 6 depicts the fastener 12 with exemplary single durometer fastener materials, e.g., hard material suitable for retention, and substantially parallel grippers 20. An inner portion 24 or stem is the same durometer as the grippers 20.

Figure 7:
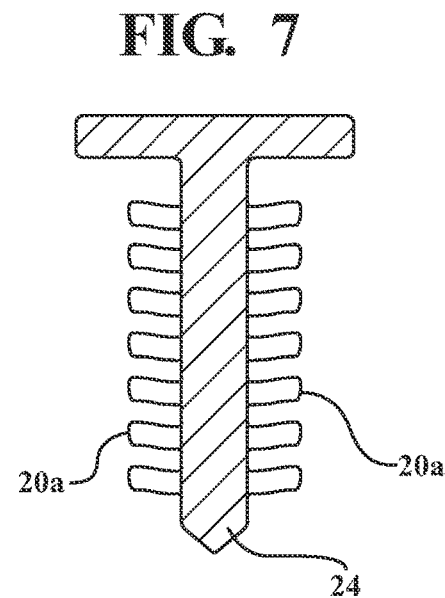
FIG. 7 is a front elevation view of an extruded integrated fastener illustrating an exemplary dual durometer and substantially parallel gripper portions, in accordance with the present invention.

FIG. 7 depicts the fastener 12 with exemplary dual durometer fastener materials. The grippers 20a are preferably thicker than the single durometer fastener. The durometer of the grippers 20a is different than the inner portion 24. Most preferably, the inner panel 24 of the fastener is a harder durometer material than the grippers 20a.

Figure 8:
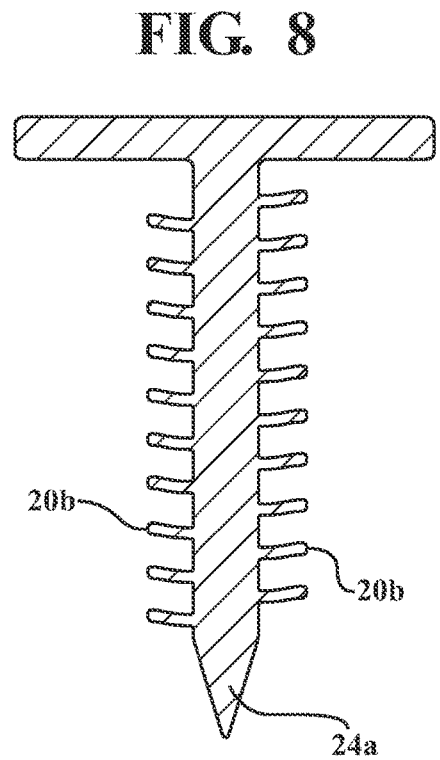
FIG. 8 is a front elevation view of an extruded integrated fastener illustrating an exemplary single durometer and offset gripper portions, in accordance with the present invention.

FIG. 8 depicts the fastener 12 with exemplary single durometer fastener materials, e.g., harder material, which is identical to FIG. 6 except that the fastener inner panel 24a is longer, and the fastener 12 has offset grippers 20b.

Figure 9:
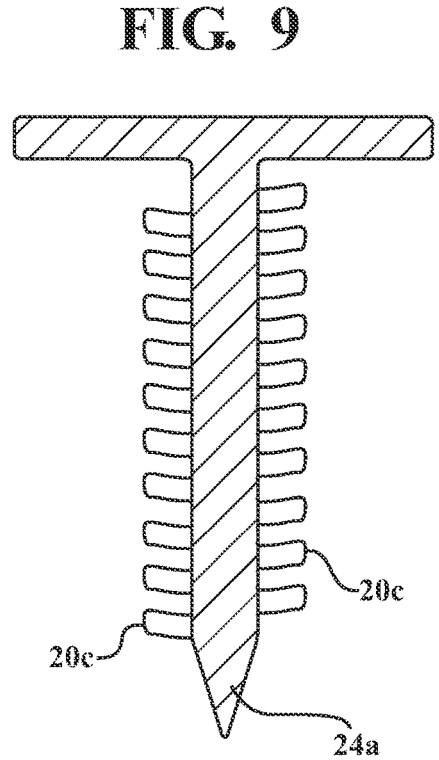
FIG. 9 is a front elevation view of an extruded integrated fastener illustrating an exemplary dual durometer material and offset gripper portions, in accordance with the present invention.

FIG. 9 depicts the fastener 12 with exemplary dual durometer materials, which fastener is identical to FIG. 7 except that the fastener inner panel 24a is longer. The grippers 20c are preferably thicker than the single durometer fastener. The durometer of the grippers 20c is different than the inner portion 24a. Most preferably, the inner panel 24a of the fastener is a harder durometer material than the grippers 20c.

The process of the present invention provides the extruded integrated fastener with at least two push pins. A continuous strip of predetermined profile is extruded. By way of non-limiting example, the extrusion includes a wider upper portion integrally formed with a lower extending portion with a plurality of grippers along the longitudinal axis of the continuous extrusion. Fabrication tooling is provided to form the integrated fastener. In particular, to fabricate notches of predetermined width along the longitudinal axis of the lower extending portion to form fasteners that are connected only at the upper portion, e.g., to gang parts together. The fabrication tooling cuts away the unwanted area on either side of each push pin. The pins can thereby be cut to any predetermined desired length depending on the application.

The process in accordance with the present invention provides improved costs in manufacturing, e.g., at least about ¼ the cost of conventional fabrication. The product also has improved retention properties. In addition, there are no loose pieces since the fasteners are ganged together. Another significant advantage is the incorporation of single or multiple durometers and various retention features.

In use, a final assembly 10 of predetermined length, depending on the application, is used, e.g., cut to length suitable for attachment to a vehicle part. Each final assembly has at least one fastener, preferably, at least two fasteners, most preferably, more than two fasteners.

Figure 10:
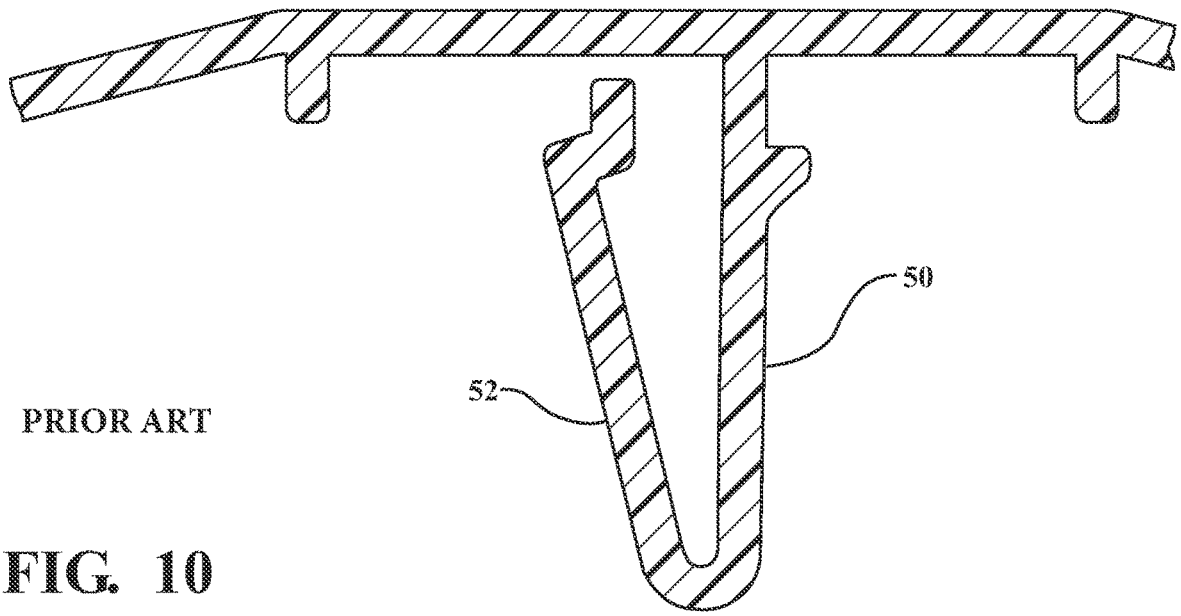
FIG. 10 is a front elevation view of a conventional attachment clip with a retention member compressed to a closed or retention position.

FIG. 10 illustrates another prior art fastener 50 that has a depressible part 52 that compresses to a closed position for retention.

Figure 11:
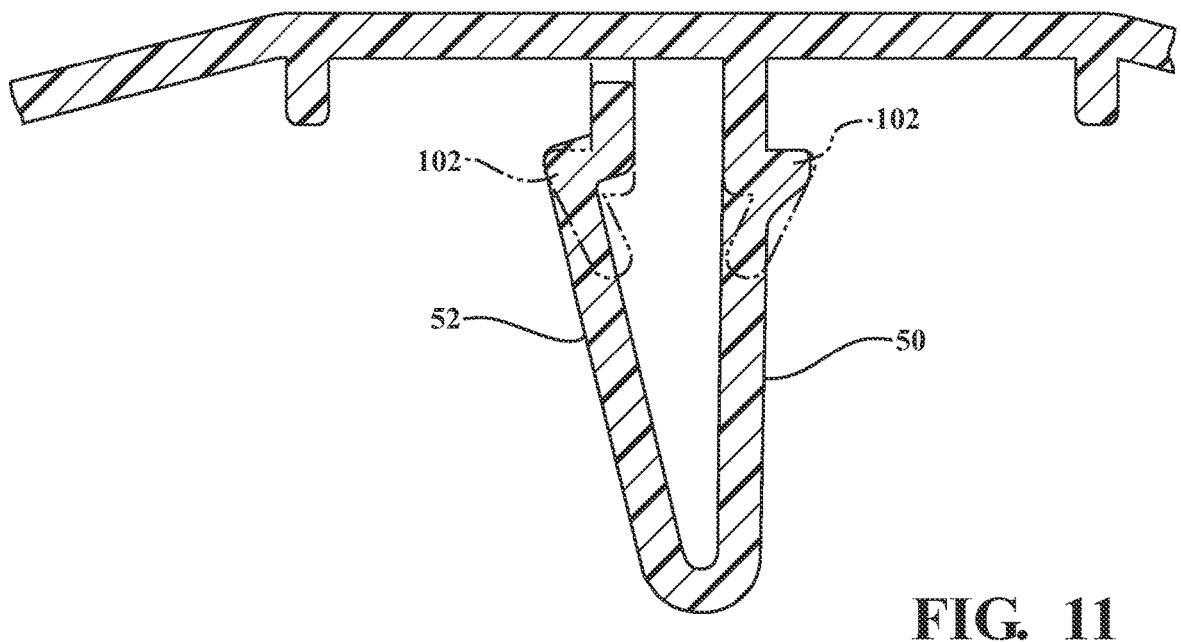
FIG. 11 is a front elevation view of the conventional attachment clip of FIG. 10 overlaid by legs of a fastener in accordance with the present invention.
Figure 12:
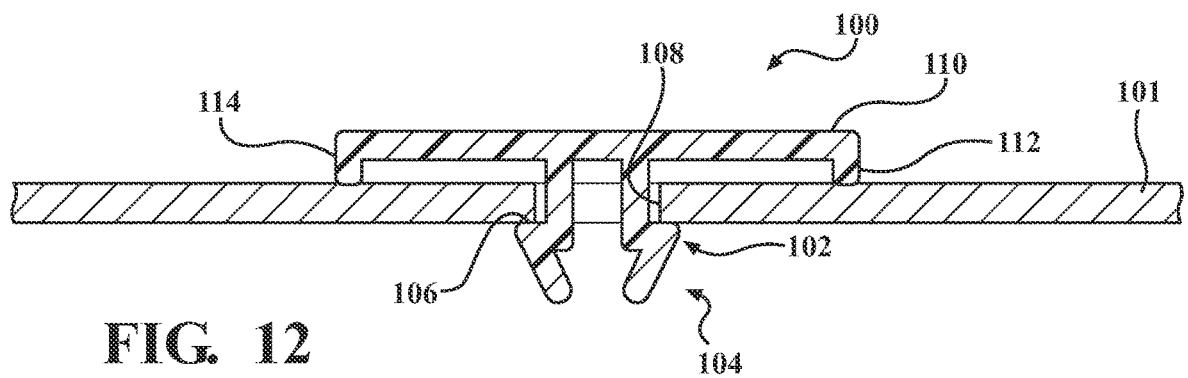
FIG. 12 is a front elevation view of an extruded integrated fastener assembly depicting a fastener pushed through an exemplary sheet metal slot from one side and retained against the other side of the sheet metal to prevent the fastener from backing out of the slot, in accordance with the present invention.

FIG. 11 illustrates legs compressible legs 102,102 of an extruded integrated fastener assembly, according to the present invention, overlaid over the conventional fastener 50, for illustration.

Referring now more particularly to FIGS. 12-18 generally, the extruded integrated fastener assembly indicated generally at 100 includes at least two fasteners shown generally at 104, e.g., preferably, attachment clips, forming the lower portion of the assembly 100. The legs 102 of each include a step portion 106. After the legs 102 are pushed from one side of a part 101 through a slot 108, sheet metal slot formed in the part, the legs 102 expand outward and each step portion 106 retains the legs 102 on the within the slot 108. An upper portion 110 of the assembly is a continuous piece that links the fasteners 104 together. The upper portion 110 includes opposing side legs 112, 114 that contact the top of the sheet, e.g., metal sheet in which the slot is formed 108. Each fastener 104 is cut to a predetermined width, length and depth.

Generally, the process of manufacturing is substantially identical as described previously, except that the fastener has legs 102 that are operably formed (or operably cut out) and have no grippers. The process for forming the assembly 100 is identical as set forth previously, wherein, in general, the continuous strip with predetermined profile is extruded and then cut out in the lower portion to define the distance between each individual fastener 104 (and the length of each fastener 104 in the longitudinal direction).

Figure 13:
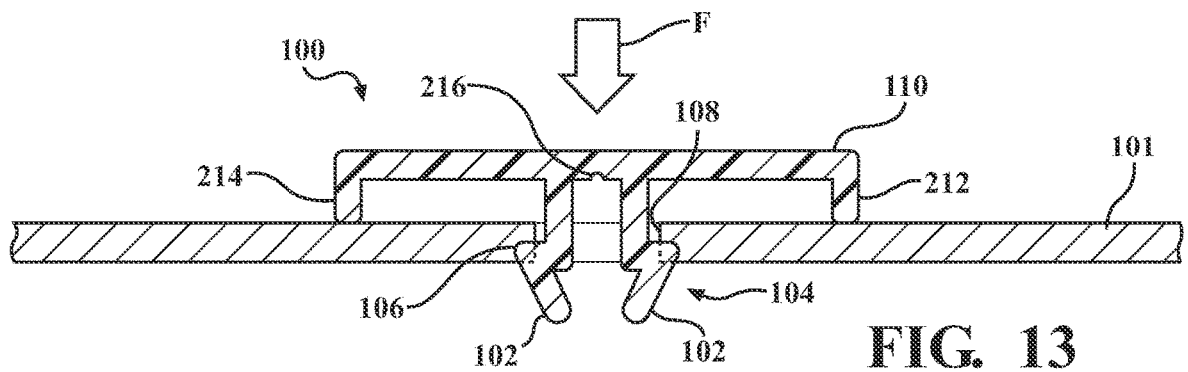
FIG. 13 is a front elevation view of an extruded integrated fastener assembly depicting a fastener, which includes a hinge area, being pushed in an engagement direction through an exemplary sheet metal slot, in accordance with the present invention.
Figure 14:
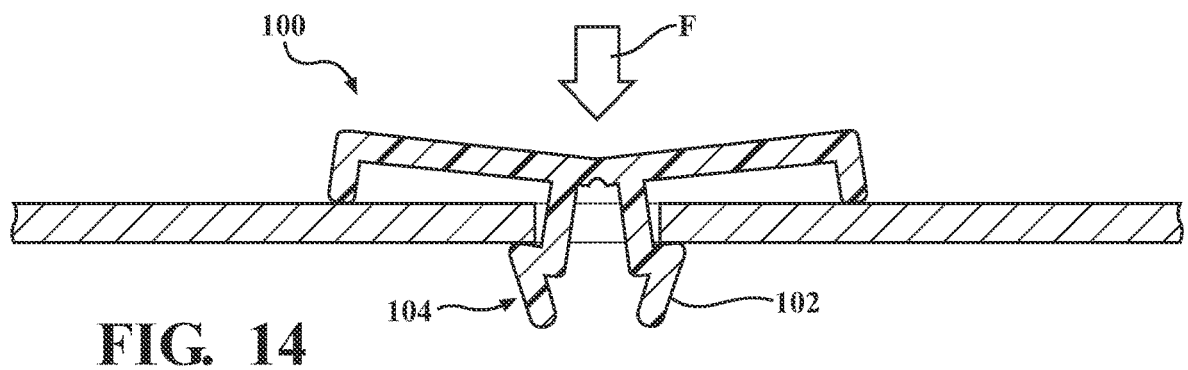
FIG. 14 is a front elevation view of the fastener of FIG. 13 with legs of the fastener pushed further in an engagement direction and extended generally outward from the application of force, in accordance with the present invention.

Referring more particularly to FIGS. 13-14 generally, the assembly 100 is substantially identical as shown and described previously, except that the opposing legs 212,214 are longer legs for built-in interference, and, a hinge 216, preferably, a small longitudinal recess or channel or notch, is also formed in the lower surface of the upper portion 110 between the legs 102, 102. This hinge 216 predicts the flex point. The upper portion 110 of the assembly is a continuous piece that links the fasteners 104 together. The legs 102, 102 are preferably longer to coordinate with the longer 212,214. The opposing side legs 212,214 contact the top of the sheet, e.g., metal sheet in which a slot is formed 108. The opposing legs 212,214 are longer legs (e.g., longer than FIG. 12, for example) for built-in interference. The fastener 104 is pushed through the slot 108 and a downward force "F" on the upper surface of the upper portion 110 opposite the hinge 216 causes the legs to push out further in an engagement direction. Each step portion 106 retains the legs 102 within the slot 108. Each fastener 104 is cut to a predetermined width. The process for forming the assembly is identical as set forth previously, wherein, in general, the continuous strip with predetermined profile is extruded and then cut out in the lower portion to define the distance between each individual fastener 104 (and the length of each fastener 104 in the longitudinal direction).

Figure 15:
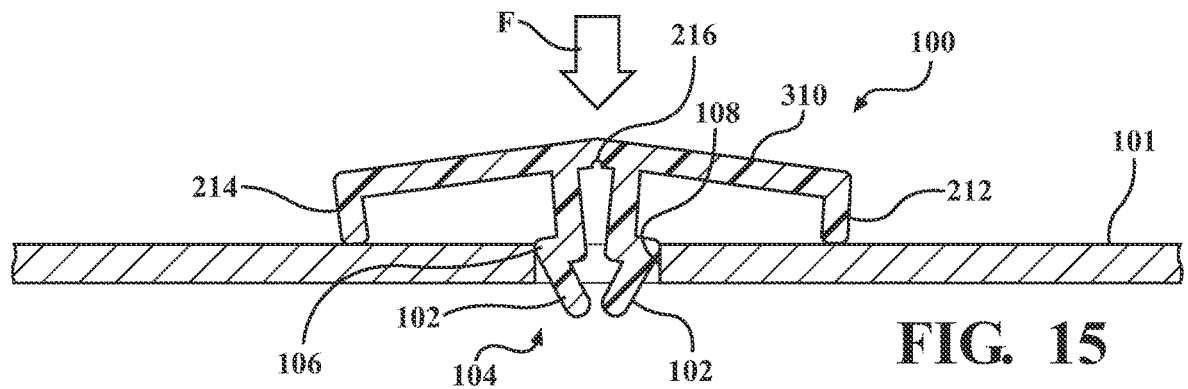
FIG. 15, is a front elevation view of an extruded integrated fastener assembly depicting a fastener including a hinge area and a reverse bow of an upper portion, the fastener depicted being pushed through an exemplary sheet metal slot, in accordance with the present invention.
Figure 16:
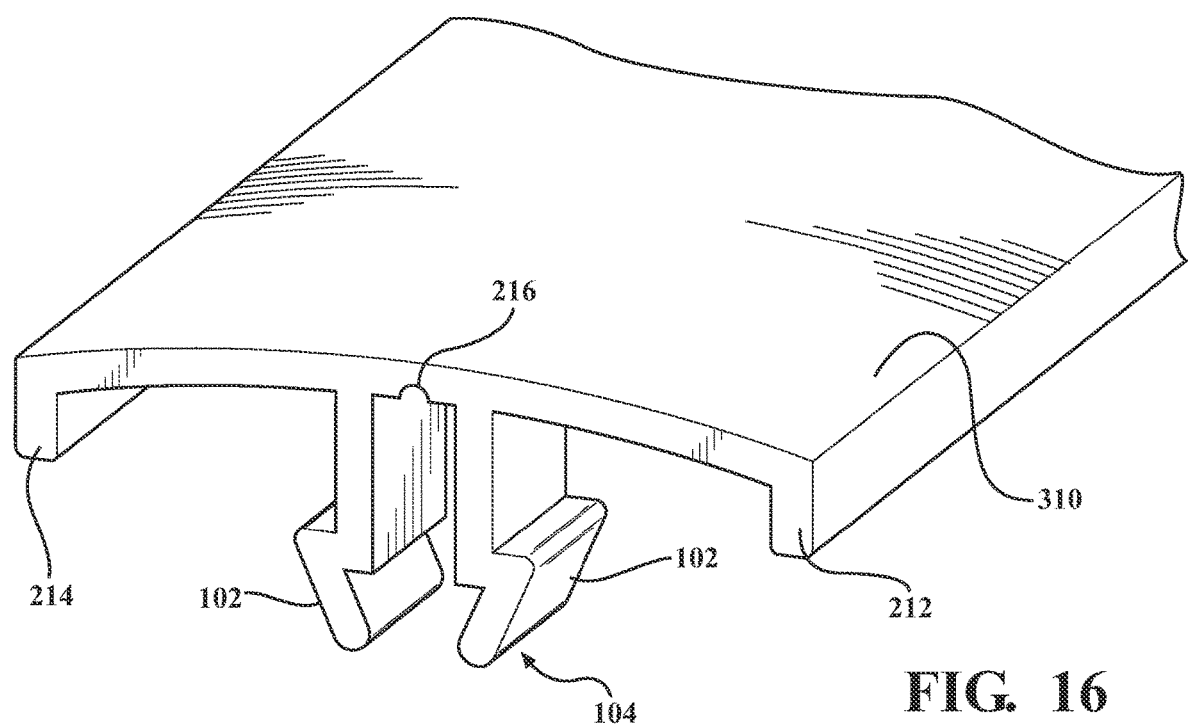
FIG. 16 is a perspective view of the extruded integrated fastener assembly of FIG. 15 with the fastener depicted at a resting position, wherein the integrated fastener assembly is broken along its length to depict that the strip may be any desired predetermined length depending on the particular application, in accordance with the present invention.
Figure 17:
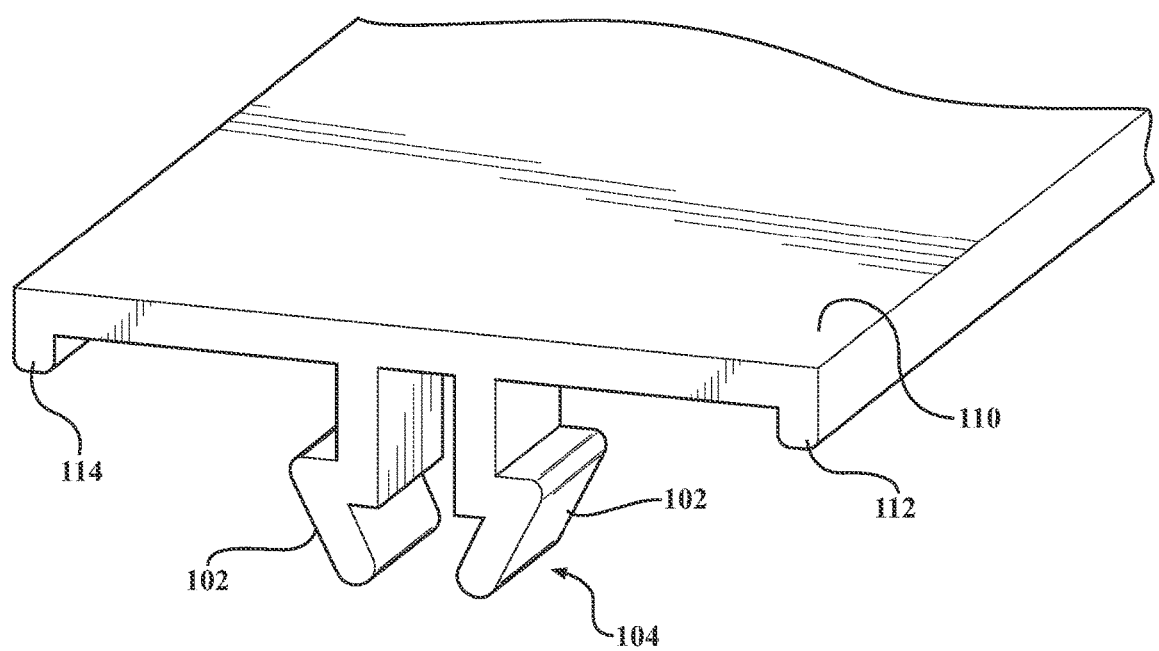
FIG. 17 is a perspective view of the extruded integrated fastener assembly of FIG. 13 with the fastener depicted at a resting position, wherein the integrated fastener assembly is broken along its length to depict that the strip may be any desired predetermined length depending on the particular application, in accordance with the present invention; and, FIG. 18 is a side elevation view of an extruded integrated fastener assembly, wherein the integrated fastener assembly is broken along its length to depict that the strip may be any desired predetermined length depending on the particular application, in accordance with the present invention.
Figure 18:
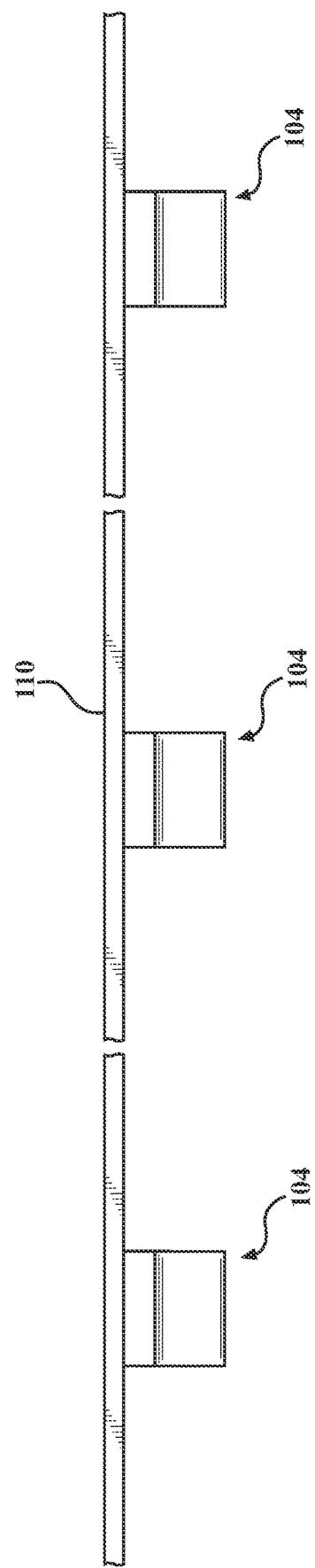

Referring to FIGS. 15-16 generally, the extruded integrated fastener assembly indicated generally at 100 includes at least two fasteners shown generally at 104, e.g., attachment clips, forming the lower portion of the assembly 100. Legs 102 of each include a step portion 106. A hinge 216, preferably, a small longitudinal axis recess or channel or notch, is formed in the lower surface of an upper portion 310 between the legs 212,214. This hinge 216 predicts the flex point. The upper portion 310 has a reverse blow to assist the fastener 104 to insert easier. The upper portion 310 of the assembly is a continuous piece that links the fasteners 104 together. The upper portion 310 also includes opposing side legs 212,214 that contact the top of the sheet, e.g., metal sheet in which a slot is formed 108. The opposing legs 312,314 are longer legs for built-in interference. Each fastener 104 is pushed through a respective slot 108 and a downward force "F" on the upper surface of the upper portion 310 opposite the hinge 216 causes the legs to push out further in an engagement direction. FIG. 15 depicts the legs 102, 102 compressed as the fastener 104 is pushed through the slot 108. Each step portion 106 retains the legs 102,102 within the slot 108. Each fastener 104 is cut to a predetermined width. Preferably, the legs 102,102 to accommodate the reverse bow, than the substantially flat upper portion. The process for forming the assembly is identical as set forth previously, wherein, in general, the continuous strip with predetermined profile is extruded and then cut out in the lower portion to define the distance between each individual fastener 104 (and the length of each fastener 304 in the longitudinal direction).

In use, a final assembly 10,100 of predetermined length, depending on the application, is used, e.g., cut to length suitable for attachment to a vehicle part. Each final assembly has at least one fastener, preferably, at least two fasteners, most preferably, more than two fasteners (e.g., see FIG. 18 broken along the length indicating that the final assembly can be any predetermined length suitable for the application.

It is understood that the legs 112,114,212,214,102,104 described or shown throughout the application can be any predetermined lengths and combinations of lengths depending on the particular applications without departure from the scope of the present invention. By way of non-limiting example, when the opposing legs 212,214 of the upper portion are longer, the corresponding legs 102,102 of the fastener are operably longer.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. An extruded integrated fastener assembly, comprising:
    a continuous strip of at least one predetermined extruded material incorporating a plurality of fasteners of predetermined length cut into the continuous strip in the same orientation as each other relative to a longitudinal axis of the continuous strip, each of said plurality of fasteners including a pair of legs;
    at least one retention member located on a side of each leg of said pair of legs adapted to operably retain each fastener with respect to an aperture of a component; and
    an expanse portion of the continuous strip linking adjacent fasteners.

2. The extruded integrated fastener assembly of claim 1, wherein the plurality of fasteners are extruded to have a predetermined profile for connection to a predetermined component with each of said plurality of fasteners operably connecting to a corresponding attachment feature of said component.

3. The extruded integrated fastener assembly of claim 1, wherein the assembly is formed of a single durometer material.

4. The extruded integrated fastener assembly of claim 1, wherein the assembly is formed of a dual durometer material.

5. The extruded integrated fastener assembly of claim 1, wherein the assembly is formed of dual durometer material, and the softer material forms a plurality of retention members.

6. The extruded integrated fastener assembly of claim 1, wherein the legs expand outward as a downward force is applied to the fastener in an engagement direction.

7. The extruded integrated fastener assembly of claim 1, further comprising a hinge to predict a flex point for installation of the plurality of fasteners to the component.

8. The extruded integrated fastener assembly of claim 1, wherein the expanse portion has a reverse bow to assist insertion of the plurality of fasteners into the component.

9. The extruded integrated fastener assembly of claim 1, wherein the plurality of fasteners are each an attachment clip with compressible ramped legs operably adapted to prevent the fastener in an installed position from backing out of the aperture formed in the component to which the plurality of fasteners are installed.

10. The extruded integrated fastener assembly of claim 1, wherein said expanse portion includes two opposing side legs that contact an outward surface of the component when said plurality of fasteners are within said apertures of the component.

11. A method of making an extruded integrated fastener assembly, comprising:
   providing at least one extruder;
   providing fabrication tooling;
   extruding at least one predetermined material of predetermined durometer forming a continuous strip of predetermined profile;
   cutting away predetermined areas of the continuous strip with the fabrication tooling to form a plurality of fasteners of predetermined length that include at least one retention member located on both sides of each of the plurality of fasteners;
   wherein the plurality of fasteners are connected together by an expanse of the at least one material that is not cut away by the fabrication tool.

12. The method of claim 11, further comprising co-extruding a softer durometer material.

\* \* \* \* \*